United States Patent Office
2,805,238
Patented Sept. 3, 1957

2,805,238

2,4 - DI(HYDROXYMETHYL)CYCLOPENTYLTRIORGANOSILANES AND PROCESS FOR THEIR PREPARATION

William T. Black, Buffalo, and Roy L. Pruett, Tonawanda, N. Y., assignors to Union Carbide Corporation, a corporation of New York No Drawing. Application March 28, 1955,
Serial No. 497,448

13 Claims. (Cl. 260—448.2)

This invention relates to new organic compounds of silicon which comprise the 2,4-di(hydroxymethyl)cyclopentyltriorganosilanes and to a process for their preparation. More particularly, the invention relates to a new class of organic compounds of silicon which comprise the alkyl, alkylalkoxy and alkoxy substituted 2,4-di(hydroxymethyl) cyclopentylsilanes and to processes for their preparation which include the hydrogenation of the 2,4-di(formyl)cyclopentyltriorganosilanes.

The new compounds of the instant invention, namely the 2,4 - di(hydroxymethyl)cyclopentyltriorganosilanes, can be represented graphically by the formula:

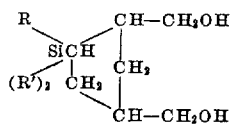

where R and R' represent organic groups such as alkyl groups and alkoxy groups. Examples of the alkyl groups which R and R' may represent include methyl, ethyl, propyl and the like groups, while examples of the alkoxy groups which R and R' may represent include methoxy, ethoxy, propoxy and the like groups. The organic groups represented by R and R' need not be necessarily like groups, that is R and R' may represent different alkyl groups, different alkoxy groups or one may represent an alkyl group while the other may represent an alkoxy group.

In accordance with our invention, the new compounds thereof are prepared by reacting a 2,4-di-(formyl)cyclopentyltriorganosilane with hydrogen to form a 2,4-di(hydroxymethyl)cyclopentyltriorganosilane. The reaction that takes place may be depicted by the following equation:

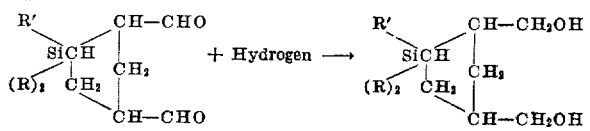

where R and R' represent organic groups as shown above.

The hydrogenation can be carried out by introducing hydrogen into a solution of the 2,4-di-(formyl)cyclopentyltriorganosilane in the presence of a hydrogenating catalyst.

The temperature at which the hydrogenation is conducted is not narrowly critical. We can employ temperatures ranging from about −30° C. to about 100° C. with good results. Although temperatures below about −30° C. and above about 100° C. may also be employed, no commensurate advantage is obtained according to our experience. In using temperatures much below −30° C. the solvent must be so chosen as to avoid freezing and crystallizing out of the starting material. Similarly it will be obvious that the temperature should not be so high as to favor decomposition of the starting material or product. Our preferred temperatures lie in the range of from about −10° C. to about 80° C.

As solvents, we can employ practically any of the so called liquid organic solvents in which our 2,4-di(formyl) cyclopentyltriorganosilane starting material is soluble and which is non-reactive, under the conditions of our process, with the 2,4-di(formyl)cyclopentyltriorganosilane starting material and hydrogen. Most desirable for use are the saturated aliphatic ethers such as diethyl ether, dipropyl ether and the like. While the alkanols, such as methanol, ethanol, propanol and the like, are capable of reacting with our starting triorganosilanes to form alkylacetals, we have found them acceptable for use as solvents as the rate at which this reaction proceeds is extremely slow when compared to the rate of the hydrogenation reaction.

We prefer to carry out the process of our invention under substantially anhydrous conditions. However, the presence of water is not objectionable, except when the starting material contains alkoxy groups bonded to the silicon atom thereof. The presence of water is objectionable in the latter case because of the tendency of the alkoxy groups to hydrolyze when in admixture therewith.

The catalysts which can be employed in the reaction of hydrogen with a 2,4-di(formyl)cyclopentyltriorganosilane include any of the well known class of hydrogenation catalysts. We prefer to use such active hydrogenation catalysts as platinum, palladium black, palladium oxide and Raney nickel. The amount of catalyst employed is not narrowly critical and from about 0.3 percent to about 3.0 percent by weight of the starting triorganosilane is preferred but higher or lower amounts can be used with good results.

In the practice of our process, the reaction between a 2,4-di(formyl)cyclopentyltriorganosilane and hydrogen is preferably conducted at pressures above atmospheric. We prefer to employ pressures ranging from about 10 atmospheres to about 75 atmospheres. However, pressures lower than 10 atmospheres and higher than 75 atmospheres may also be employed.

The 2,4-di(formyl)cyclopentyltriorganosilane starting materials suitable for use in our process may be graphically represented by the formula:

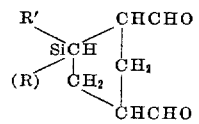

where R and R' represent organic groups such as alkyl groups or alkoxy groups. Examples of the alkyl groups which R and R' may represent include methyl, ethyl, propyl and the like groups, while examples of the alkoxy groups which R and R' may represent include methoxy, ethoxy, propoxy and the like groups. The organic groups represented by R and R' need not be necessarily like groups, that is R and R' may represent different alkyl groups, different alkoxy groups or one may represent an alkyl group while the other may represent an alkoxy group. Such compounds are disclosed and claimed in copending United States application Serial No. 497,414, filed concurrently herewith.

Our starting compounds are prepared by first reacting a bicyclo(2.2.1)hept-5-enyl-2-triorganosilane with ozone to form an ozonide and then hydrogenating the resulting ozonide with the formation of a 2,4-di(formyl)cyclopentyltriorganosilane. For example, 2,4-di(formyl)cyclopentyltriethoxysilane can be prepared by reacting bicyclo(2.2.1)hept-5-enyl-2-triethoxysilane while in solution with ozone at a temperature below about 30° C. and then introducing hydrogen into the solution of the resulting ozonide at a temperature below about 50° C. and in the presence of a hydrogenating catalyst.

The 2,4-di(hydroxymethyl)cyclopentyltriorganosilanes of this invention are obtained by first preparing a solution of a 2,4-di(formyl)cyclopentyltriorganosilane, such as a solution comprising 2,4-di(formyl)cyclopentyltriethylsilane dissolved in diethyl ether, placing the solution in a pressure vessel and adding a catalyst such as platinum, thereto. Hydrogen is then introduced into the solution under pressure, as for example under a pressure of about 10 atmospheres. The catalyst can be removed from the product of the reaction by filtering while the solvent can be removed by distillation.

The following example is illustrative of our invention.

Example

An ethanol solution of 2,4-di(formyl)cyclopentyltriethoxysilane was prepared by first bubbling ozone, produced in the silent electric discharge at a concentration of about 4 mole percent in oxygen, through a solution (cooled to a temperature of about −78° C. with the aid of a bath cooled with solid carbon dioxide) comprising 26.4 grams of bicyclo(2.2.1)hept-5-enyl-2-triethyoxysilane dissolved in 150 cc. of absolute ethanol, to prepare the ozonide of bicyclo(2.2.1)hept-5-enyl-2-triethoxysilane. After the reaction was complete, absorbed excess ozone and oxygen were removed from the reaction solution by sparging with nitrogen. The prepared ozonide of bicyclo(2.2.1)hept-5-enyl-2-triethoxysilane was then hydrogenated under 3 atmospheres pressure by introducing hydrogen into a solution thereof at a temperature of about 0° C. and in the presence of about 0.5 gram of palladium black to form an ethanol solution of 2,4-di(formyl)cyclopentyltriethoxysilane. The catalyst was removed from the solution by filtering.

The ethanol solution of 2,4-di(formyl)cyclopentyltriethoxysilane was placed in a high pressure vessel and from 10 to 20 grams of Raney nickel added thereto. Hydrogen was introduced into the solution until the pressure in the vessel reached 75 atmospheres at which point the temperature of the reaction mixture was 80° C. After a period of about 16 hours the pressure vessel was opened and the catalyst removed from the resulting solution by a filtering step conducted under nitrogen. Ethanol was then removed from the solution by a vacuum stripping operation. Toluene was added to the residue and the resulting solution again stripped under a vacuum. The diol was obtained as a residue (21.8 grams) in the form of a thick viscous syrup. This residue was identified as 2,4 - di(hydroxymethyl)cyclopentyltriethoxysilane upon analysis with the following data obtained:

|   | Analysis (Wt. Percent) | Theory (Wt. Percent) (EtO)₃SiCH——CH—CH₂OH<br>   ĊH₂   ĊH₂<br>      ＼／<br>      ĊH—CH₂OH |
|---|---|---|
| C | 49.9 | 53.4 |
| H | 8.0 | 9.6 |
| OH | 7.0 | 10.8 |

We have found that the new compounds of our invention can also be prepared by employing a solution of the ozonide of a bicyclo(2.2.1)hept-5-enyl-2-triorganosilane as the starting material with which hydrogen reacts. However, it has been our experience that lower yields and longer reaction times result if the 2,4-di(hydroxymethly)cyclopentyltriorganosilanes are prepared from the ozonide in a single operation employing a single catalyst.

Without wishing to be bound by any particular theory, one possible explanation for the desirability of first converting the ozonide to the dialdehyde in a separate operation is that no single catalyst is the most effective for both of the reactions involved. For example, while Raney nickel was found most desirable as the catalyst employed to prepare the 2,4-di(hydroxymethyl)cyclopentyltriorganosilanes from the 2,4-di(formyl)cyclopentyltriorganosilanes, it is not the most desirable catalyst for the preparation of the 2,4-di(formyl)cyclopentyltriorganosilanes from the ozonides of the bicycloheptenyltriorganosilanes. In the latter instance it was found that Raney nickel exhibited some tendency to decompose the ozonide as well as catalyze the hydrogenation of the ozonide. On the other hand, a catalyst such as palladium black is desirable in the hydrogenation of the ozonide to the dialdehyde, however, such catalyst is not as active as Raney nickel in the hydrogenation of the dialdehyde to the dihydroxy compounds of the invention.

The new compounds of our invention, by virtue of their hydroxy groups, find particular use as cross-linking materials in the preparation of cured polysiloxanes. Such cured compositions find use as coatings having improved resistance to thermal degradation. The new compounds of our invention can also be esterified with acid-modified alkyd resins to form a new class of silicon-containing polyesters having utility as coatings, as modifying agents for polysiloxane wire-enamels and as plasticizing resins of the alkyd type. The 2,4-di(hydroxymethyl)cyclopentyltriorganosilanes of the invention may also be esterified with the known triorgano(1,4-dicarboxy-2-butyl)silanes to form a new class of silicon-containing polyesters.

What is claimed is:

1. A process for preparing a 2,4-di(hydroxymethyl)-cyclopentyltriorganosilane represented by the graphic formula:

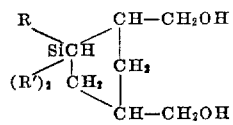

wherein R and R′ represent organic groups taken from the class consisting of alkyl groups and alkoxy groups which comprises introducing hydrogen into a solution of a 2,4-di(formyl)cyclopentyltriorganosilane represented by the graphic formula:

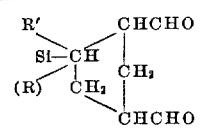

wherein R and R′ represent organic groups taken from the class consisting of alkyl groups and alkoxy groups, in the presence of a hydrogenating catalyst.

2. A process for preparing a 2,4-di(hydroxymethyl)cyclopentyltriorganosilane represented by the graphic formula:

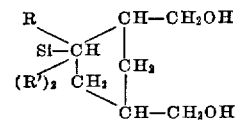

wherein R and R′ represent organic groups taken from the class consisting of alkyl groups and alkoxy groups which comprises introducing ozone into a solution of a bicyclo(2.2.1)hept-5-enyl-2-triorganosilane wherein the organic groups are taken from the class consisting of alkyl and alkoxy groups, at a temperature below about 30° C. to prepare the ozonide of said bicyclo(2.2.1)hept-5-enyl-2-triorganosilane, introducing hydrogen into the solution of said ozonized bicyclo(2.2.1)hept-5-enyl-2-triorganosilane at a temperature below about 50° C. in the presence of palladium black to prepare a 2,4-di(formyl)-cyclopentyltriorganosilane represented graphically by the formula:

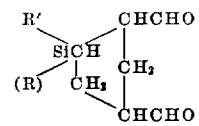

wherein R and R′ represent organic groups taken from the class consisting of alkyl groups and alkoxy groups and introducing hydrogen into the solution of said 2,4-di-(formyl)cyclopentyltriorganosilane in the presence of Raney nickel at a temperature below about 100° C. and at a pressure above atmospheric pressure.

3. A process for preparing a 2,4-di(hydroxymethyl)-cyclopentyltrialkylsilane which comprises introducing hydrogen into a solution of a 2,4-di(formyl)cyclopentyltrialkylsilane in the presence of a hydrogenating catalyst.

4. A process for preparing a 2,4-di(hydroxymethyl)-cyclopentyltrialkoxysilane which comprises introducing hydrogen into a solution of a 2,4-di(formyl)cyclopentyltrialkoxysilane in the presence of a hydrogenating catalyst.

5. A process for preparing a 2,4-di(hydroxymethyl)-cyclopentyltrialkylsilane which comprises introducing hydrogen into an alkanol solution of a 2,4-di(formyl)cyclopentyltrialkylsilane in the presence of a hydrogenating catalyst, at a temperature below about 100° C. and at a pressure above atmospheric pressure.

6. A process for preparing a 2,4-di(hydroxymethyl)-cyclopentyltrialkoxysilane which comprises introducing hydrogen into an alkanol solution of a 2,4-di(formyl)-cyclopentyltrialkoxysilane in the presence of a hydrogenating catalyst, at a temperature below about 100° C. and at a pressure above atmospheric pressure.

7. A process for preparing a 2,4-di(hydroxymethyl)-cyclopentyltriethoxysilane which comprises introducing hydrogen into an ethanol solution of a 2,4-di(formyl)cyclopentyltriethoxysilane in the presence of Raney nickel, at a temperature below about 100° C. and at a pressure of at least 10 atmospheres.

8. A process for preparing a 2,4-di(hydroxymethyl)-cyclopentyltriethylsilane which comprises introducing hydrogen into an ethanol solution of a 2,4-di(formyl)cyclopentyltriethylsilane in the presence of Raney nickel, at a temperature below about 100° C. and at a pressure of at least 10 atmospheres.

9. 2,4 - di(hydroxymethyl)cyclopentyltriorganosilanes graphically represented by the formula:

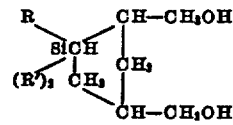

wherein R and R' represent organic groups taken from the class consisting of alkyl groups and alkoxy groups.

10. 2,4-di(hydroxymethyl)cyclopentyltrialkoxysilanes.
11. 2,4-di(hydroxymethyl)cyclopentyltriethoxysilane.
12. 2,4-di(hydroxymethyl)cyclopentyltrialkylsilanes.
13. 2,4-di(hydroxymethyl)cyclopentyltriethylsilane.

No references cited.

UNITED STATES PATENT OFFICE
Certificate of Correction

Patent No. 2,805,238                         September 3, 1957

William T. Black et al.

It is hereby certified that error appears in the printed specification of the above numbered patent requiring correction and that the said Letters Patent should read as corrected below.

Column 1, lines 27 to 32, the formula should appear as shown below instead of as in the patent:

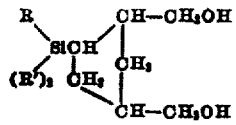

lines 50 to 54, the equation should appear as shown below instead of as in the patent:

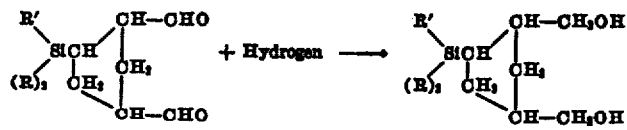

column 2, lines 43 to 49, the formula should appear as shown below instead of as in the patent:

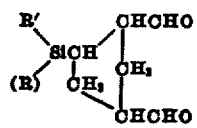

column 3, line 66, for "methly)" read —methyl)—; column 4, lines 29 to 34, the formula should appear as shown below instead of as in the patent:

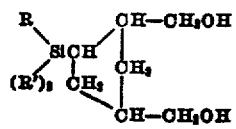

lines 39 to 44, the formula should appear as shown below instead of as in the patent:

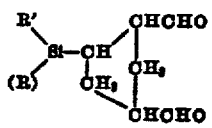

lines 50 to 55, the formula should appear as shown below instead of as in the patent:

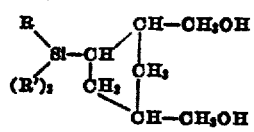

lines 69 to 73, the formula should appear as shown below instead of as in the patent:

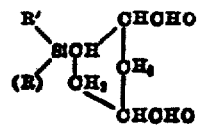

2,805,238 column 6, lines 14 to 19, the formula should appear as shown below instead of as in the patent:

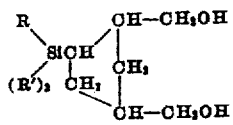

Signed and sealed this 4th day of February 1958.

[SEAL]

Attest:
KARL H. AXLINE,
*Attesting Officer.*

ROBERT C. WATSON,
*Commissioner of Patents.*